Oct. 25, 1960 J. DOLZA 2,957,464
FUEL INJECTION SYSTEM
Filed June 18, 1956 6 Sheets-Sheet 1

INVENTOR.
John Dolza
BY
L. J. Burek
ATTORNEY

INVENTOR.
John Dolza
BY L.D. Burch
ATTORNEY

Oct. 25, 1960 J. DOLZA 2,957,464
FUEL INJECTION SYSTEM
Filed June 18, 1956 6 Sheets—Sheet 5

INVENTOR.
John Dolza
BY L. D. Burch
ATTORNEY

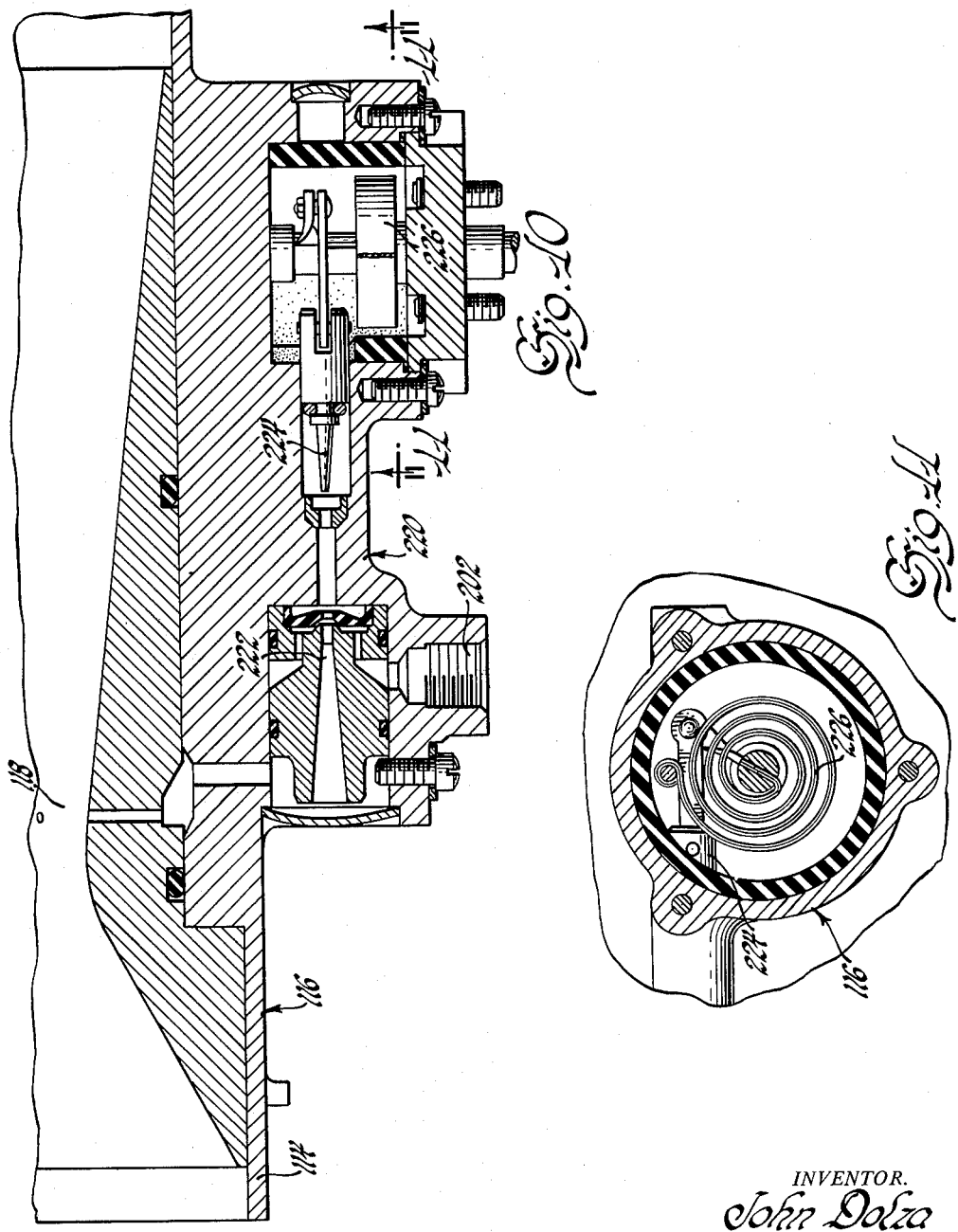

United States Patent Office 2,957,464
Patented Oct. 25, 1960

2,957,464
FUEL INJECTION SYSTEM

John Dolza, Fenton, Mich., assignor to General Motors Corporation, Detroit, Mich., a corporation of Delaware Filed June 18, 1956, Ser. No. 591,889

50 Claims. (Cl. 123—119)

The present invention relates to internal combustion engines and more particularly to the fuel supply means therefor.

In a so-called spark ignited engine atomized fuel is mixed with air to form a combustible charge which is compressed and burned in the engine cylinders. To obtain maximum performance and economy from such an engine, this charge must not only have a large volume, but also the air and fuel must be accurately mixed in some predetermined proportions with each of the cylinders receiving identical charges. Heretofore, in order to achieve these objectives in engines for automotive and related uses, it has been the practice to employ one or more carburetors that are mounted on an intake manifold having a plurality of induction passages for distributing the charge to the various engine cylinders. Although such arrangements have operated satisfactorily in the past, in a modern high performance engine, the inherent limitations in such an arrangement become more apparent and in many instances materially limit the output of the engine. For example, due to the necessary shapes of the distribution passages in the intake manifold and the variations in the distances to the various cylinders, there is a certain amount of non-uniformity in the distribution of the charge to the cylinders both as to volume and as to proportions. In order to overcome these limitations and thus increase the economy and output of the engine, a large amount of time and effort has been expended to replace the conventional carburetor with charge forming means in which the fuel is injected directly into the charge at or immediately adjacent the combustion chamber or intake valve. By injecting the fuel in this manner it may be accurately divided up into equal increments while it is still in the liquid state with there being no possibility of the fuel intended for one cylinder entering another cylinder. In addition, a minimum amount of manifolding will be required and a higher volumetric efficiency can be obtained. From the foregoing it may be seen that a fuel injection system appears to offer several advantages over a more conventional carburetor arrangement, and in view thereof a tremendous amount of effort has been directed towards developing a fuel injection system satisfactory for use on mass produced automotive engines. However, in spite of all of these efforts, so far nobody has developed a reliable injection system capable of accurately metering fuel over the wide range required by a present day passenger car. Among some of the numerous objections to the previous injection systems are an inability to operate smoothly, if at all, during idle, road load, full load, etc., and they require a considerable number of delicate parts that must be accurately machined. Each individual system requires a special adjustment by a skilled person at the time of installation and after installation they require frequent and continual precision adjustment. In order to correct for these peculiarities in the systems, it has been the practice to add numerous compensating devices. Although some of these devices have improved the operation of the system, they are usually an expensive addition and of a complicated and delicate nature and present more troubles than they solve. As a result the previous systems have been limited to special applications such as aircraft, racing vehicles, so-called "sports cars" and other installations where initial expense, maintenance, peculiarities in operation, etc., are of secondary importance. From the foregoing it will be seen that in spite of a large amount of effort, nobody heretofore has satisfactorily developed a fuel injection system that meets all of the requirements to make it suitable for use on a mass produced automobile.

It is now proposed to provide a fuel injection system for internal combustion engines which is not only economical to manufacture but is also particularly adapted for use on mass produced automotive engines. The proposed system includes a minimum number of moving parts, all of which may be manufactured with conventional production tolerances. Thus it may be seen that the system and the component parts thereof are readily adapted to be mass produced. In addition, since the parts of the system are not necessarily precision fits, the parts of the system do not require any undue amount of individual adjustment either at the time of the original installation or more than normal periodic service readjustment during operation. However, in spite of this simplification of the system, the system is still capable of accurately metering the precise amount of fuel required by the engine during all engine operating conditions, and dividing this fuel into equal increments and delivering them to the various cylinders of the engine so as to insure a smooth and continuous operation of the engine at all times.

This is to be accomplished by providing the fuel system with means capable of sensing the mass of air flowing through the engine, means capable of sensing the amount of fuel that is being required in the engine and metering means for maintaining the quantities of air and fuel in some predetermined proportions. More particularly, this is to be accomplished by providing a restriction such as a venturi in the induction inlet that will develop a pressure differential or venturi throat vacuum, the magnitude of which will be indicative of the quantity or mass of air flow. This vacuum produces a force on a diaphragm that is exerted on a flow control valve effective to control the flow of fuel. The present valve is disposed in a distributing chamber and is effective to control the flow of metered fuel by regulating the amount of fuel by-passed from the distributing chamber back to the source. One end of this by-pass valve is subject to the fuel pressure in the distributing chamber which is indicative of the amount of fuel flow to the cylinders. The opposed air and fuel forces are balanced against each other and are effective to vary the fuel flow until they are in some predetermined ratio. At that time the air and fuel will be flowing in the desired proportions.

During the major portion of the operation of an engine, the engine drives a road load which is less than the maximum power available from the engine. Accordingly, it is desirable that the engine be supplied with a charge suitable for maximum economy. However, during some transient circumstances it is desirable to supply the engine with a somewhat richer mixture. For example, starting the engine while it is cold periods of acceleration, maximum power operation, idle operation, off idle operation require a mixture somewhat richer than is provided for maximum economy. In order to provide a somewhat richer mixture at or near idle operation, an orifice may be disposed adjacent the throttle plate on the downstream side thereof when the throttle valve is in the fully closed position and is interconnected with the venturi throat. Thus the air pressure signal representing venturi throat vacuum will be slightly increased by the intake vacuum. This modified signal is directed to the metering diaphragm and since it will be slightly stronger it will thus provide a slight increase in the fuel flow during idling over that which would normally be provided by the venturi throat vacuum. In addition, a second orifice may be disposed slightly anterior to the throttle plate so that when the throttle valve is slightly opened and the engine starts to drive a load, the induction air must flow through the reduced space between the edge of the throttle plate and the side of the induction passage and pass across the second orifice. The reduced space will create an increase in the speed of air flowing across the mouth of the orifice which will, in turn, produce a localized venturi effect or vacuum. This vacuum will, in turn, tend to strengthen the signal produced from the venturi throat. The increased signal will, in turn, effectively increase the force on the control diaphragm and produce a somewhat richer mixture. As soon as the throttle plate has moved past the off idle position, the intake vacuum on the first orifice and the local disturbance adjacent the second orifice will no longer exist and the control diaphragm will be supplied with an unmodified signal from the venturi throat. Accordingly, once above the slower speeds and in the normal range of operation, the engine will be supplied with an economy charge.

When starting an internal combustion engine it may be desirable to supply a sufficiently rich mixture of air and fuel to the cylinders to insure an easily ignitable charge. Normally, such a charge is considerably richer than is provided by the normal metering action but the demand is limited to only the initial starting or cranking period. Accordingly, a solenoid may be interconnected with the starter circuit for actuating the starting enrichment mechanism during the cranking operation. The enrichment mechanism may enrich the charge by supplying an extra quantity of fuel to the distributing chamber and/or forcing the by-pass valve into the closed position. In addition, the solenoid may also include a plunger effective to open a valve in the outlet from the transfer pump during the cranking operation. This will allow unmetered quantities of fuel to flow from the transfer pump and into the distributing chamber from whence it will be injected into the charges for the cylinders. Once the engine has fired and is running under its own power, the solenoid will be deenergized and the normal metering action will be restored.

Once the engine is running it will not require the large quantities of fuel provided by the starter enrichment mechanism. However, while the engine is operating at subnormal temperatures, it is desirable to supply a slightly richer mixture than would be obtained from the normal metering action. Accordingly, during such a period it is desirable during the warm up period to increase the amount of fuel delivered to the cylinders. This enrichment may be accomplished by increasing the strength of the vacuum signal from the venturi throat. The strength of the signal may be increased by providing a booster venturi in series with the venturi throat and feeding the signal from the booster venturi throat to the diaphragm. During normal engine operation the inlet to the booster venturi is closed and as a result, the diaphragm will be exposed to the normal vacuum produced in the venturi throat. However, when the engine is operating at subnormal temperatures, the inlet to the booster venturi may be opened to allow air to flow through the booster venturi and multiply the venturi throat vacuum. The multiplied signal will then increase the force on the diaphragm and cause a somewhat larger fuel flow to the distributing chamber. The action of this inlet valve may be thermostatically controlled.

During normal operation of the engine the charge supplied to the cylinders will result in maximum economy operation. However, during certain engine conditions it is desirable to obtain maximum power with the economy being of secondary importance. Accordingly, the relative effectiveness of the opposed air and fuel pressures may be altered to change the air-fuel ratio when it is desired to obtain a charge suitable for maximum power. Since the intake vacuum will normally be very small at or near full load, the enrichment adjustment may be responsive to the intake vacuum and is effective to modify the effectiveness of the linkage interconnecting the by-pass valve and the diaphragm. During the normal range of operation the intake vacuum will adjust the linkage for maximum economy operation. However, when the intake vacuum approaches the normal vacuum for full power operation, the mechanical leverage will be altered to produce a charge suitable for maximum power.

In the five sheets of drawings:

Figure 10 is a fragmentary cross sectional view of a venturi intake suitable for use in the system illustrated in Figure 2.

Figure 11 is a fragmentary cross sectional view taken substantially along the plane of line 11—11 in Figure 10.

Figure 1:
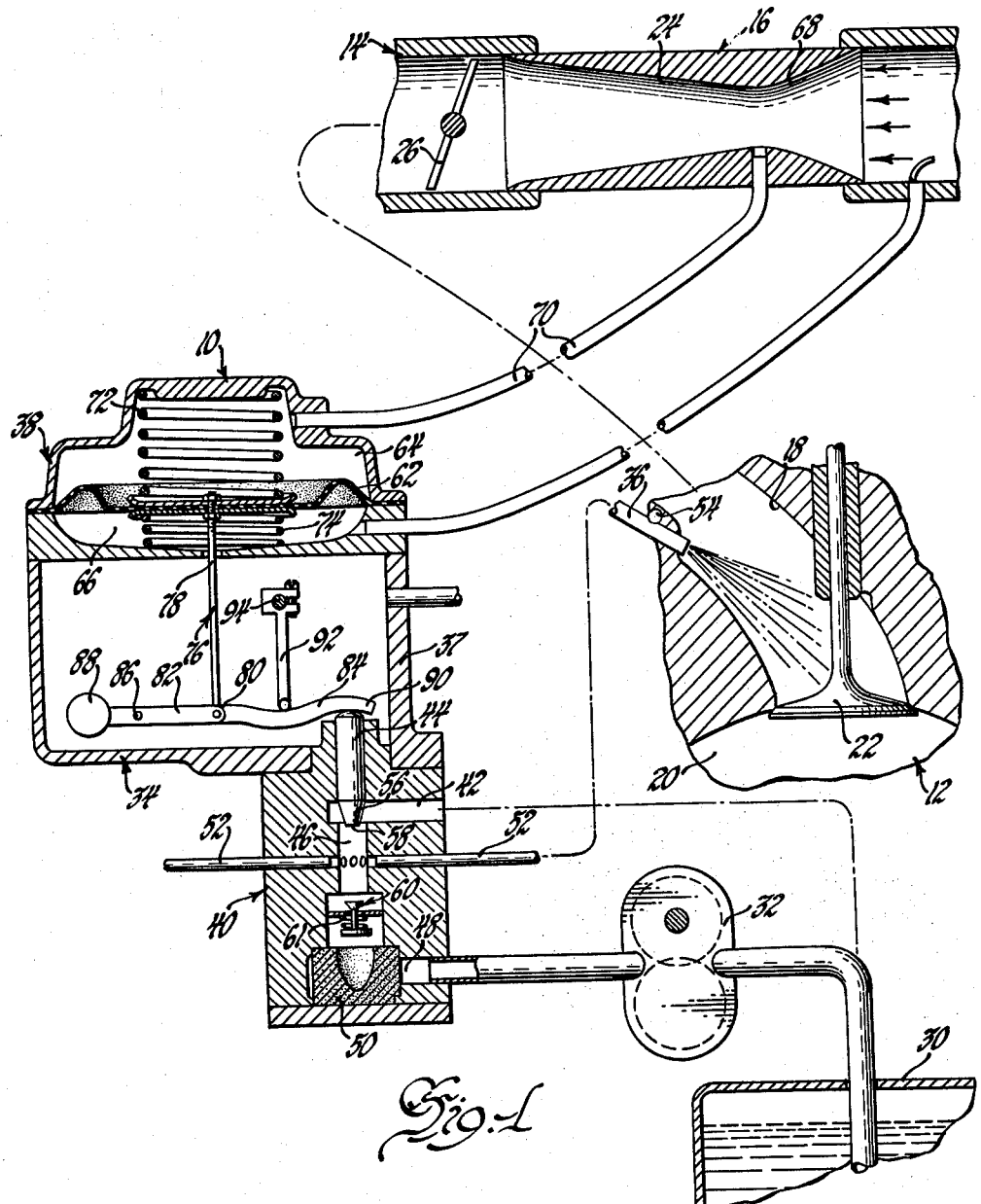
Figure 1 is a view of a fuel injection system embodying the present invention.

Referring to the drawings in more detail the present invention may be employed in a fuel system 10 adapted for use on any suitable internal combustion engine 12. However, in the present instance the system 10 is used on a so-called spark ignited engine 12 having an induction system 14 that includes an air intake 16 and a plurality of induction passages 18 that are interconnected with the intake 16 and terminate in the combustion chamber 20 for supplying air thereto. The air flow into the cylinders is controlled by the intake valves 22. The intake 16 includes a venturi 24 and a manually adjusted throttle valve 26 that is preferably disposed immediately posterior to the venturi 24 for controlling the volume of air flow therethrough.

In order to form the combustible charge for the cylinders, the fuel system 10 includes a fuel storage tank 30, fuel pumping means 32 for circulating the fuel through the system 10, a metering mechanism 34 for maintaining the fuel flow in the desired proportions to the air flow, and a plurality of nozzles 36 located in the intake passages 18 adjacent the intake valves 22 for discharging the atomized fuel directly into the air as it flows into the cylinders. The pump means 32 may be of any desired design and, in fact, if desired, may include a transfer or supply pump located adjacent the storage tank and an injection pump. These pumps do not have to be calibrated so as to deliver some predetermined quantities of fuel, i.e., meter the fuel. However, they preferably deliver a surplus of fuel at a pressure in excess of that required to operate the system 10.

The metering unit 34 includes a housing 37 having a diaphragm chamber 38 in the top thereof and a fuel distributor and regulator 40 in the bottom thereof. The fuel distributor and regulator portion 40 includes an outlet 42 with a flow control valve 44 therein, a distributing chamber 46 and an inlet 48 which may be connected to the pump means 32. It has been found desirable to provide a strainer or filter element 50 in this inlet 48 for removing any impurities that might otherwise impair the operation of the system 10. The inlet 48 includes a chamber connected to the bottom of the vertical distributing chamber 46 so that the fuel from the inlet 48 will flow vertically upwardly through the distributing chamber 46. A plurality of identical injector lines 52 may radiate outwardly from the chamber with the outer ends thereof including nozzles 36 located in the induction passages 18 and aimed to direct streams of fuel toward the intake valves 22. In order to obtain uniform distribution of the fuel to all of the cylinders, it is desirable for the hydraulic resistances of the nozzles 36 to be considerably larger than that of the injector lines 52 and thereby be the primary factor controlling the quantity of fuel flow. Thus any minor irregularities in the injector lines 52 will have little or no effect on the metering and distribution of fuel to the cylinders. These nozzles 36 are preferably similar to those disposed in copending applications Serial No. 512,175, filed May 31, 1955, now abandoned, and Serial No. 608,893, filed September 10, 1956, now Patent No. 2,860,859, wherein the fuel is discharged through a small orifice disposed in an envelope of air at substantially atmospheric pressure provided by air vent 54 and aimed to direct a stream of fuel through a second opening and into the induction system. Thus the fuel system will be isolated from the intake vacuum and the resistances of the small orifices will be the controlling factors regulating the fuel flows.

The outlet or fuel control valve 44 may be disposed in the top of the distribution chamber 46 for regulating the amount of spill fuel by-passed from the distributing chamber 46 and returned to the fuel storage tank 30. Accordingly, it will be seen that the position of the control valve 44 will regulate or meter the amount of fuel flow to the cylinders. In the present instance this valve is a piston slidably disposed in a vertical bore with a tapered end 56 reciprocating in the opening 42 so that axial movement will vary the effective area thereof. The lower end of the piston has a flat portion 58 of some predetermined area that will be exposed to the pressure of the fuel in the distributing chamber 46. This will result in an upwardly force on the piston tending to lift it out of the outlet 42. It should be noted that the resistances of all the injector lines 52 and nozzles 36 are the equivalent of a single orifice. Thus since the fuel discharged from the nozzle 36 is always at approximately atmospheric pressure, the pressure of the fuel in the distributing chamber 46 will be indicative of the quantity of fuel flowing to the cylinders. Therefore, the vertical force on the piston will be indicative of the quantity of the metered fuel flowing to the cylinders.

During normal operation the fuel will flow from the pump 32 through the inlet 48 and be discharged through the injector lines 52 and/or the control valve 44. However, when the engine 12 is not in operation, there may be a tendency for a reverse flow to develop. For example, there may be sufficient heat to cause the fuel in the distributing chamber 46, injector lines 52, etc. to vaporize and back up into the pump 32 and other portions of the system 10. Accordingly, it has been found desirable to provide a one-way check valve 60 that will prevent any backing up of the vapors. This valve 60 is preferably disposed as close as possible to the distributing chamber 46 to insure a minimum volume downstream thereof. This check valve 60 may be of any desired construction. However, in the present instance it is merely a poppet valve biased by a spring 61 toward the closed position. Although an excess spring tension is not desirable the spring 61 should maintain sufficient pressure in the upstream portion of the system 10 to prevent the formation of any vapors therein.

The diaphragm chamber 38 includes a flexible diaphragm 62 that extends horizontally thereacross so as to divide the chamber into an uper compartment 64 and a lower compartment 66. The upper compartment 64 is preferably connected to the throat 68 of the venturi 24 by a tube 70 while the lower compartment 66 is preferably vented to the intake 16 immediately anterior to the venturi 24. It may thus be seen that as the air flows through the venturi 24 and a vacuum develops in the throat 68, the diaphragm 62 will have a force thereon indicative of the quantity of air flowing through the venturi 24 and into the cylinders. The diaphragm 62 may be connected to the control valve by a linkage 76 that will transfer the force on the diaphragm to the piston. A pair of springs 72 and 74 may be provided, if desired, to bias the diaphragm toward some predetermined position. Although the linkage 76 may be of any suitable form in the present instance it includes a vertical link 78 connected to the joint 80 between a counterweight lever 82 and a lever 84. The counterweight lever 82 may pivot about a fixed pin 86 and have a weight 88 on the end thereof that will tend to balance the weight of the various portions of the linkage system 76. The outer end 90 of the lever 84 rests on the upper end of the plunger 44 while the center pivots about the lower end of an adjustable ratio arm 92. Thus it will be seen that the difference in air pressure on the diaphragm 62 will produce a downward force on the piston that will bias it against the fuel pressure in the distributing chamber 46.

It can be appreciated that by rocking the ratio arm 92 about the shaft 94, the mechanical advantage of the linkage 76 can be varied so that the amount of the force transferred from the diaphragm 62 to the plunger 44 can be readily adjusted.

As previously stated the position of the plunger 44 in the outlet 42 regulates the volume of by-passed fuel and thereby controls or meters the amount of fuel distributed to the various cylinders and also the fuel pressure inside of the distributing chamber 46 will exert an upward force on the bottom of the plunger 44 which will tend to raise the plunger 44 and increase hte amount of fuel by-passed. This will, in turn, decrease the amount of fuel flowing to the cylinders. However, the force produced by the air flow will tend to force the plunger 44 downwardly into the outlet 42 and increase the supply of fuel to the cylinders. Thus it may be seen that the air flow and fuel flow will produce forces opposing each other and cause movement of the plunger 44 until the two forces are balanced. When these two forces are balanced the air and fuel will be flowing in some predetermined ratio. The proportions of this ratio will be determined by the area of the diaphragm 62, the area of the plunger 44 exposed to the fuel pressure, and the mechanical advantage of the linkage 76. It should be noted that this ratio can readily be adjusted by varying the position of the ratio arm 92.

Figure 2:
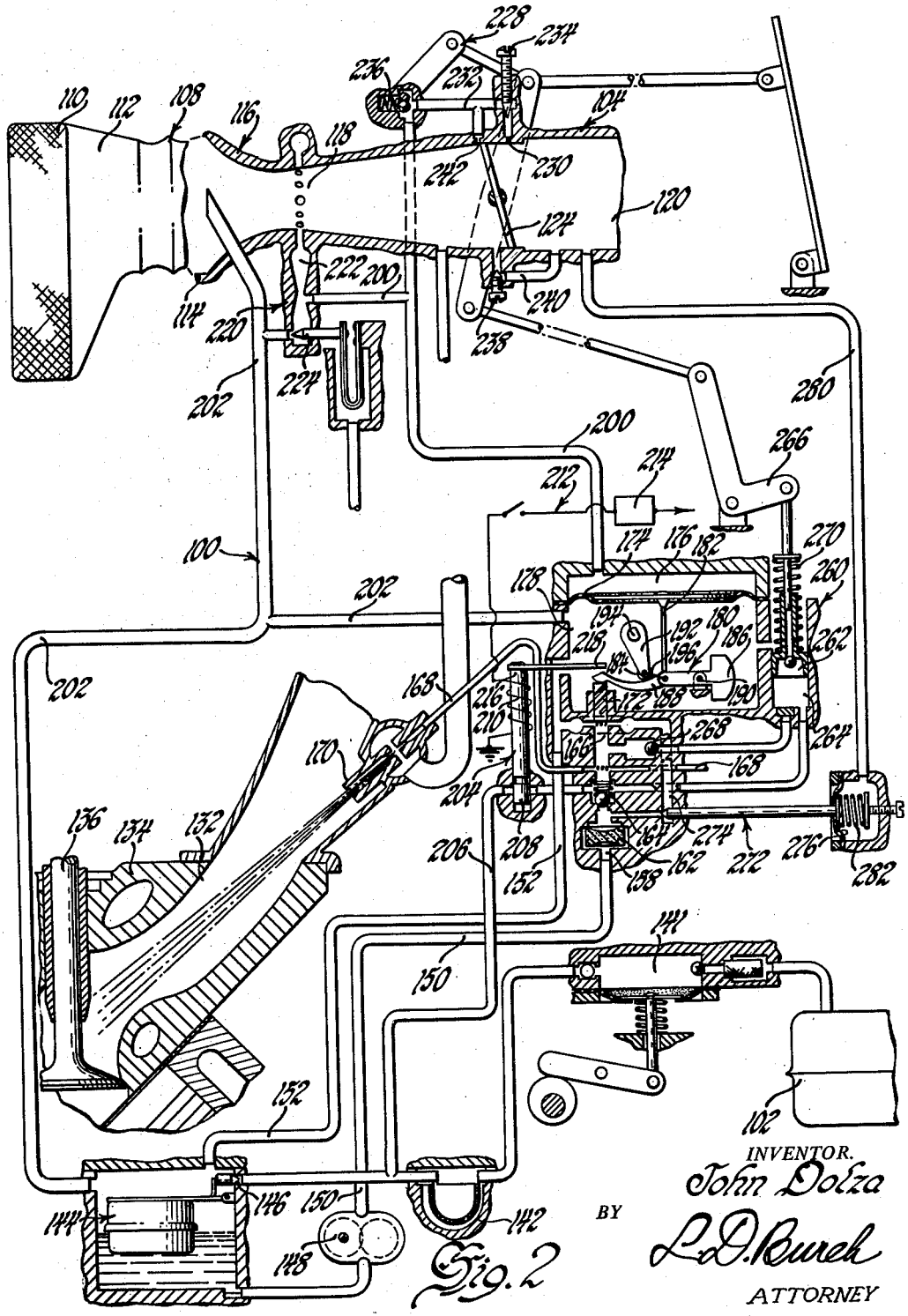
Figure 2 is a similar view of another fuel injection system incorporating another embodiment of the present invention.
Figure 3:
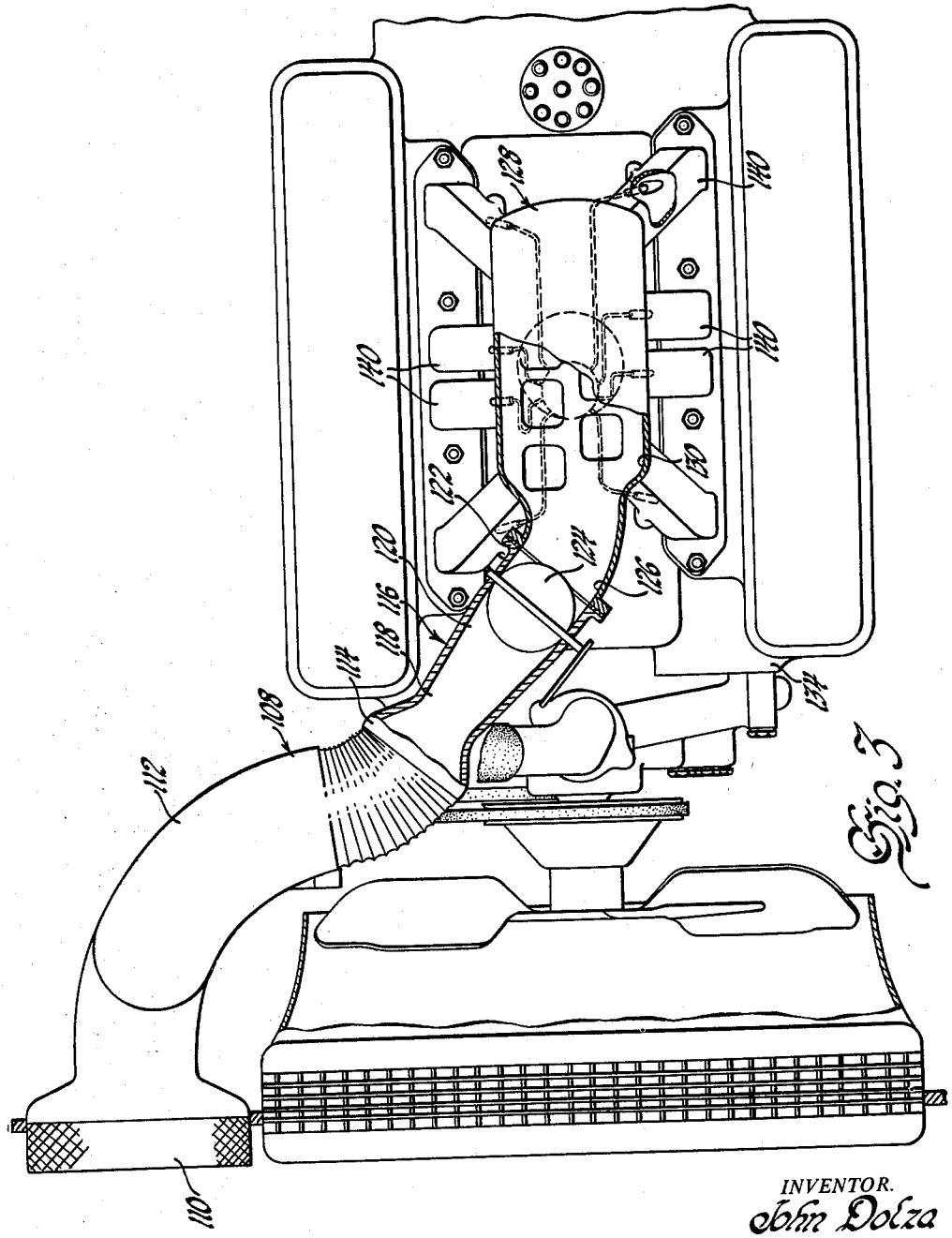
Figure 3 is a plan view of an engine employing a fuel injection system embodying the present invention.
Figure 4:
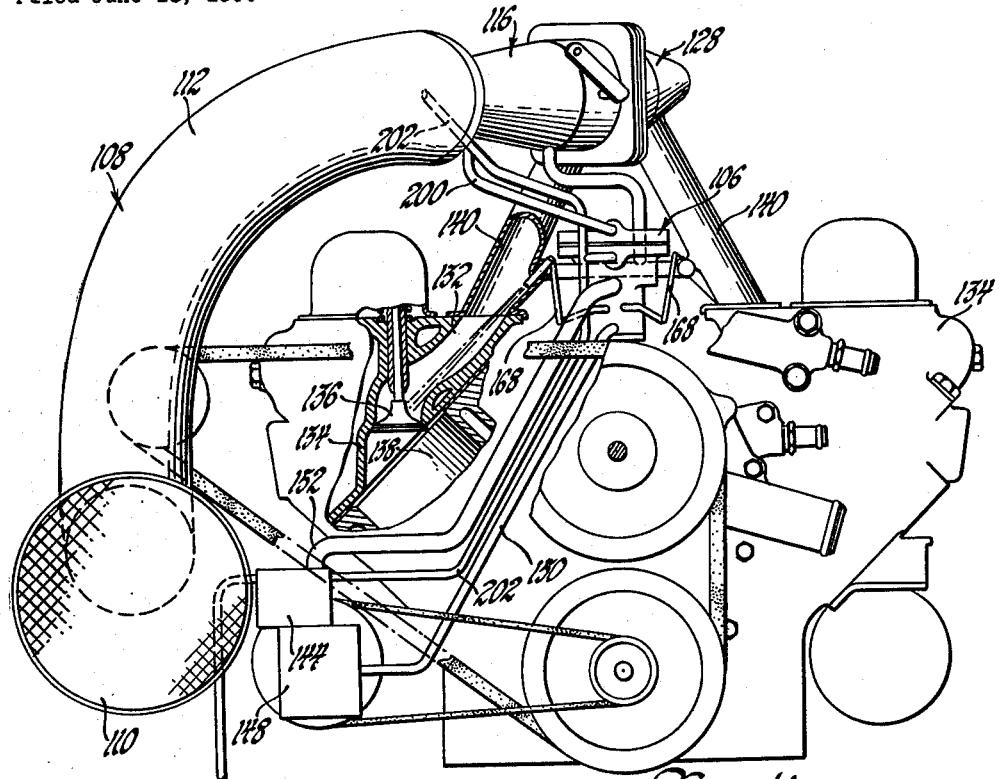
Figure 4 is an end view of the engine in Figure 3.
Figure 5:
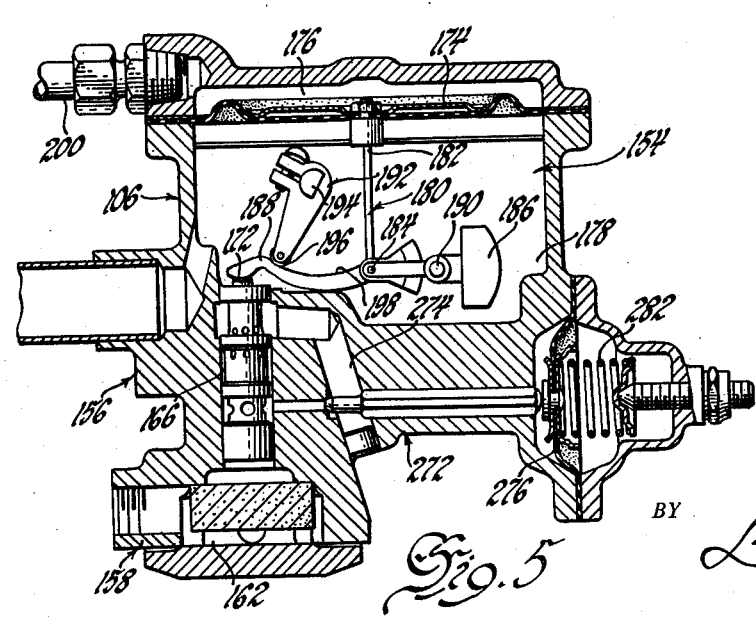
Figure 5 is a cross sectional view of the metering unit suitable for use in the system in Figure 2 and taken substantially along the plane of line 5—5 in Figure 6.
Figure 6:
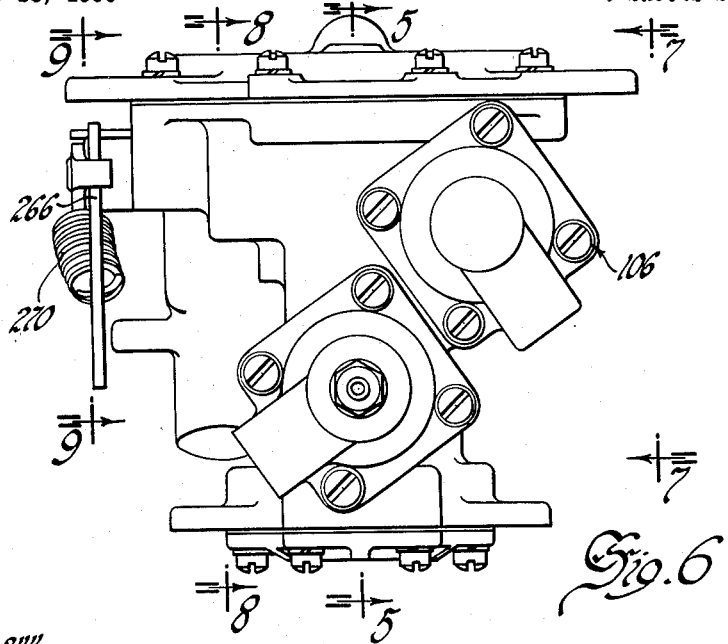
Figure 6 is a side view of the metering unit in Figure 5.
Figure 7:
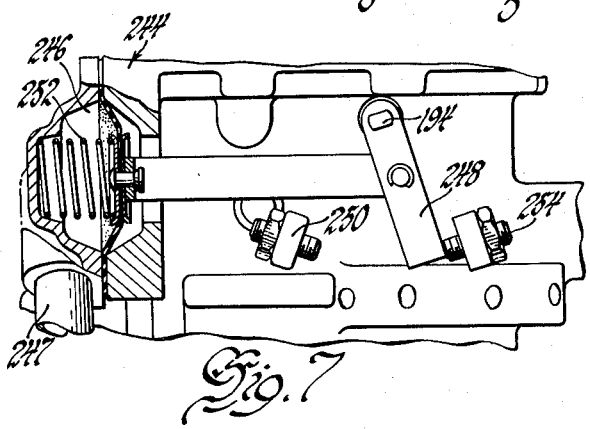
Figure 7 is a fragmentary cross sectional side view of the metering unit taken as indicated by line 7—7 in Figure 6.
Figure 8:
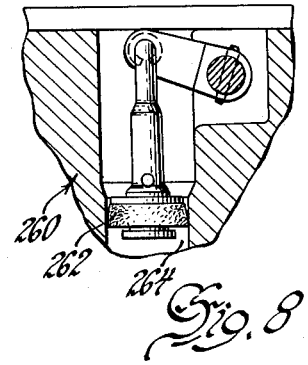
Figure 8 is a fragmentary cross sectional view taken substantially along the plane of line 8—8 in Figure 6.
Figure 9:
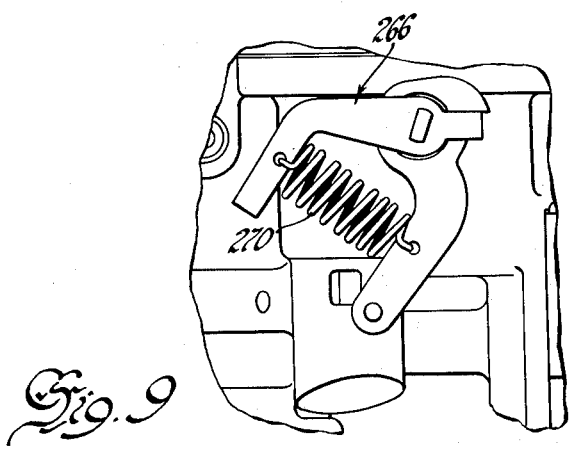
Figure 9 is a fragmentary side view of the metering unit taken as indicated by line 9—9 in Figure 6.

It may therefore be seen that a simple fuel injection system 10 has been provided which is particularly adapted for supplying fuel to the combustible charge in some predetermined proportions. Although the foregoing system will supply a charge satisfactory for most operating conditions, under some engine operating conditions such as idling, maximum load, etc., it is desirable to modify the proportions of the charge. Accordingly, the embodiment 100 shown in Figures 2 to 11, inclusive, may be employed.

This system 100 is very similar to the first embodiment 10 in that it includes a source of fuel 102, an air metering unit 104 and a fuel metering unit 106 responsive to the air flow through the system for metering the fuel in proportion thereto. However, in addition, it also includes several enrichment devices for modifying the air-fuel ratio.

The induction system 108 includes a filtered intake 110 having a flexible conduit 112 that is connected to the inlet 114 of a venturi 116. The venturi 116 includes a restricted throat 118 that expands in a tail section 120 to form an outlet 122. A throttle valve 124 for regulating the volume of air flow and thus the speed of the engine is preferably disposed downstream from the throat 118; for example, in the tail section 120. The outlet 122 of the venturi 116 is connected to the inlet 126 for the intake manifold 128.

The present intake manifold 128 includes a central plenum chamber 130 which is interconnected to the intake passages 132 in the cylinder heads 134. The intake valves 136 control the flow of air into the cylinders 138. It has been found highly advantageous to interconnect the plenum chamber 130 with the intake passages 132 by means of tubular conduits 140. These conduits 140 in combination with the intake passages 132 are preferably dimensioned in accordance with the timing of the intake valves 136 so that they will resonate during one or more engine operating conditions. During such conditions resonant surges of air will tend to supercharge the cylinders 138 and increase the output of the engine.

A comparatively low pressure transfer pump 141 draws fuel from the storage tank 102 and forces it through a filter unit 142 into a float chamber 144. A float controlled needle valve 146 regulates the fuel flow into the chamber 144 and maintains a substantially constant level of fuel so that a continuous supply of fuel will always be available. An injector pump 148 draws fuel from the bottom of this float chamber 144 and forces the fuel through its outlet 150 and into the injection system. Since this pump 148 does not actually contribute to the metering of the fuel, it may be of any suitable type and driven in any suitable manner. However, it has been found desirable to employ a gear type pump driven from the engine so that the pump output will bear some relation to the speed of the engine and, consequently, also to the fuel demands of the engine. Normally, this output will have a larger volume and pressure than the maximum demands of the engine with the surplus being returned from the system to the float chamber 144 by a spill fuel line 152. This will reduce the load on the transfer pump 141 as it will only be required to supply to the float chamber 144 "make up" fuel or in other words the amount of fuel which is actually consumed by the engine. It should be noted that although the injector pump 148 may draw fuel direct from the storage tank 102, the use of a transfer pump 141 and float chamber 144 has been found advantageous as it greatly reduces the likelihood of vapor lock and insures a continuous supply of fuel to the system at all times.

The fuel metering unit 106 has a diaphragm chamber 154 on the top thereof and a fuel controlling portion 156 on the bottom thereof. The fuel controlling portion 156 has an inlet 158 connected to the outlet 150 of the injector pump 148 by a tube 160. This tube 160 feeds fuel under the required pressure into the inlet 158 which includes a secondary strainer 162 and an anti-percolation valve 164 similar to those in the first embodiment. After passing through the anti-percolation valve 164 the fuel enters the bottom of the distributing chamber 166 and flows axially upwardly therethrough.

Injector lines 168 radiate outwardly from the center of the chamber 166 for distributing the fuel to the injection nozzles 170 which are preferably disposed adjacent the intake valves 136. In addition, a by-pass or plunger valve 172 is located in the top of the distributing chamber 166. It will thus be seen that the fuel entering the distributing chamber 166 will flow upwardly and divide with the metered portion passing through the injector lines 168 for distribution to the cylinders 138 and the excess portion leaving through the by-pass valve 172 for return to the flow chamber 144 via the spill fuel line 152. The volume of the metered fuel is controlled by the position of the plunger valve 172 which regulates the amount of fuel by-passed through the spill fuel line 152. It will be seen that, since the hydraulic resistance of the injector lines 168, nozzles 170, etc. are the equivalent of a single fixed orifice, the pressure of the fuel in the distributing chamber 166 will be indicative of the volume of fuel flowing to the cylinders 138. Thus the upward force on the bottom of the plunger 172 will also be indicative of this volume of the metered fuel.

The diaphragm chamber 154 has a flexible diaphragm 174 extending thereacross to form an upper compartment 176 and a lower compartment 178. This diaphragm 174 is operatively interconnected with the plunger valve 172 by a linkage 180 having a vertical link 182 connected to a pivot joint 184 between a counterweight lever 186 and an actuator lever 188. The counterweight lever 186 pivots about a fixed pin 190 while the actuator lever 188 pivots about the end of a ratio arm 192. The ratio arm 192 is mounted on a shaft 194 extending across the lower compartment 178 so that the roller 196 on the lower end of arm 192 may ride on the cam surface 198 on the actuator lever 188. It is, of course, apparent that the position of the ratio arm 192 will control the mechanism advantage of the linkage 180.

The compartment 176 above the diaphragm 174 is connected to the venturi throat 118 by a control signal line 200 and thus as the air flows through the venturi 116, a vacuum will be developed in the throat 118 and transmitted to the upper diaphragm compartment 176. The lower compartment 178 is connected to the vent line 202 so as to maintain substantially atmospheric air pressure therein or the pressure immediately above the venturi 116. Thus there will be a pressure differential across the diaphragm 154 to produce a force thereon which is indicative of the amount of air flowing into the engine.

It will thus be seen that, as in the first embodiment, the plunger 172 will be subjected to a pair of opposed forces. A downward force representing the amount of air flow and an upward force representing the amount of fuel flow, and the plunger valve 172 will adjust itself so that the air and fuel are flowing in some predetermined ratio. This ratio will be dependent upon the angular position of the ratio arm 192. Since the engine will usually operate at only part load and is seldom required to produce its maximum power, during normal operation the ratio arm 192 is preferably retained in a position to produce a lean charge suitable for maximum economy.

When starting the engine it is desirable to provide an excessively rich mixture that is more easily ignitable than the normal charge and, accordingly, a starting enrichment device 204 may be provided. It should be noted that the air-fuel ratio of a starting charge is not extremely critical and as long as it is sufficiently rich, it may vary over a considerable range. However, such a charge is considerably richer than is desirable for running the engine and, accordingly, is only supplied during the cranking or starting operation. The enrichment device 204 may be effective to deliver a supplemental supply of fuel to the distributing chamber 166 and/or be effective to limit the amount of fuel by-passed from the distributing chamber 166 through valve 172 to the spill fuel line 152.

The present enrichment device 204 employs both of these features. A starting enrichment line 206 is connected between the outlet of the filter 142 and the distributing chamber 166. Since the injector pump 148 may be difficult to prime and/or have a very small fuel delivery at the slow cranking speeds, it is preferable that the starting enrichment line be adapted to receive fuel from the outlet of the transfer pump 141 so that the large volume of fuel therefrom may be readily available for this purpose. A starting valve 208 controlled by a solenoid 210 is disposed in the enrichment line 206 for regulating the flow. The starting enrichment valve is normally retained closed to eliminate any fuel flow into or out of the distributing chamber 166. The solenoid 210 is connected to the starting circuit 212 and whenever the starter 214 is energized, the solenoid plunger 216 will open the starter valve 208 and allow the fuel from the transfer pump 141 to flow directly into the distributing chamber 166. Although the pressure of the transfer pump 141 may be very low, by delivering the fuel to the distributing chamber 166 posterior to the anti-percolation valve 164, this pressure drop will be eliminated and the pump 141 will have adequate pressure for distributing sufficient quantities of fuel to the cylinders 138 for starting purposes. Although this fuel flow will be substantially unmetered it will produce an easily ignitable charge. In addition to or as an alternative for the foregoing arrangement, the solenoid plunger 216 may also have an arm 218 on the upper end thereof that will simultaneously engage and depress the control plunger 172 to block the spill ports during the cranking operation. Thus all of the fuel delivered to the distributing chamber 166 will be distributed to the various engine cylinders 138. It should be borne in mind that in the event the injector pump 148 has an output with a sufficient volume of fuel during the cranking operation, starting enrichment may be accomplished by merely depressing the control plunger 172. On the other hand, in the event the transfer pump 141 produces a sufficient supply of fuel, the fuel may be delivered directly to the distributing chamber 166 without closing the by-pass control.

After the engine has started and is operating under its own power but at subnormal temperatures, it may be desirable to provide a slightly richer charge than is desirable at normal operating temperatures. Accordingly, a warm-up enrichment device 220 may be provided which will be responsive to the engine temperatures and will produce the desired amount of enrichment of the charge when the engine is operating at subnormal temperatures. In the present instance such enrichment is accomplished by modifying the strength of the venturi throat signal as it appears in the control signal line 200 whenever the engine temperature is below the normal amount. The warm-up device 220 includes a small size booster venturi 222 which is in series with the primary venturi throat 118 as may be seen from reference to Figures 2 and 10. This booster venturi may draw air directly from the atmosphere or as shown it may draw air from the balance tube 202. Thus it will only receive air that has previously passed through the air filter 110. The amount of air flow through the booster venturi 222 is regulated by a booster control valve 224 disposed between the balance tube 202 and the venturi throat 118. When this valve 224 is closed there will be no flow of air from the balance tube 202 and through the booster venturi 222. Consequently, the vacuum developed in the venturi throat 118 will be transmitted through the control signal line 200 to the diaphragm chamber 154 without any change and the normal air-fuel ratio will result. However, when the booster valve 224 opens air may flow from the vent tube 202 through the booster venturi 222 and into the throat 118 of the primary venturi 116. This air flow will tend to multiply the strength of the venturi throat signal and will thus decrease the air-fuel ratio. Of course, the amount of the strengthening of the signal and the decrease in the air-fuel ratio is determined by the amount the booster valve 224 is opened. The position of the booster control valve 224 may be regulated in any suitable means such as manually or by an automatic control. In the present instance a bimetallic thermostatic element 226 is provided to open and close the valve 224. The heat for actuating the thermostatic element may be supplied by hot air from a stove in heat exchanging relation with the engine or an electrical heating element interconnected with the engine ignition system.

When the engine is at or near its normal operating temperatures, the thermostatic element 226 will close the booster control valve 224 and eliminate any air flow therethrough. However, when the engine is below its normal operating temperatures, the thermostatic element 226 will extract the control valve 224 an amount determined by the temperature of the engine and air will flow from the vent tube 202 through the booster venturi 222 and into the venturi throat 118. Thus the venturi throat vacuum will be multiplied to some extent depending upon the volume of air flow from the vent tube 202 through the booster venturi 222. The resultant modified venturi throat vacuum signal will be transmitted through the control signal line to the diaphragm chamber 154. Consequently, the air-fuel ratio will be richened in accordance with the modified signal.

During idle operation of the engine the air flow through the venturi 116 is so small that the resultant signal may not be strong enough to insure an accurate metering action. In addition, it is also desirable during such operation to provide a somewhat richer mixture than is employed during usual operation. Accordingly, an idle enrichment circuit 228 may be provided to strengthen the venturi throat vacuum signal during idle operation. The present idle enrichment circuit 228 includes a small orifice 230 which is located just downstream from the throttle valve 124 to sense the intake vacuum. An idle enrichment tube 232 having an adjustable needle valve 234 and a control valve 236 therein interconnects this orifice 230 with the control signal line 200. The control valve 236 will be spring biased toward the closed position. However, the valve 236 is connected to the throttle linkage so that it will be forced into the open position only when the throttle valve 124 is in the idle or off-idle position. In other words the control signal line 200 will be isolated from the idle circuit 228 and its effects except during idle operation. The needle valve 234 will be effective to control the amount of modification of the control signal strength.

During idle operation the throttle valve 124 will be closed and the control valve 236 will be open. Thus the intake vacuum as modified by the needle valve 234 will be transmitted to the control signal line 200 to strengthen the venturi throat signal and thus increase the richness of the idle charge. A set screw 238 in an idle air by-pass 240 around the throttle valve 124 may control the idle air volume and consequently, the idle speed of the engine.

As soon as the throttle valve 124 commences opening, i.e., it is in the off-idle position, the engine speed will increase slightly above the idle speed and the engine will normally begin to drive a load. Under these circumstances in order to insure a smoothly operating engine and also the development of enough power to drive the load, it is desirable to provide a charge somewhat richer than is provided during normal operation. Since even a minor opening of the throttle valve will cause considerable change in the intake vacuum, the intake vacuum signal from the idle orifice does not provide an entirely satisfactory signal source during this phase. Accordingly, a second or off-idle orifice 242 may be disposed immediately adjacent the upstream side of the throttle valve 124 and connected to the idle enrichment line 232 between the control valve 236 and the needle valve 234. This second orifice 242 is so positioned that it will be immediately adjacent the periphery of the throttle plate 124. Thus the air will flow through the small space between the edge of the throttle valve 124 and the wall of the venturi 116 and across the off-idle orifice 242. The air flowing through this restricted space will produce a localized pressure drop or venturi effect that will be sensed by the off-idle orifice 242. This localized pressure drop will be transmitted to the control signal line 200 by the idle tube 232 to strengthen the venturi throat signal and thereby cause a richer charge in this phase of operation. When the throttle valve 124 has opened past this orifice 242 the localized effects will no longer exist and complete control will be restored to the venturi signal. However, it has been found desirable to have the control valve 236 close as soon as the throttle valve 124 has passed the off-idle position and positively isolate the venturi throat signal from any effects which might otherwise be produced by the idle and off-idle orifices 230 and 242 during the normal range of operation.

As previously stated the engine will normally operate the large majority of the time at some fraction of its total rated capacity and will seldom be called upon to develop its maximum power. Accordingly, it is preferable that the charge normally supplied to the engine have an air-fuel ratio suitable for maximum economy. Since such a charge is too lean to permit obtaining the maximum power from the engine, it is desirable to provide some suitable means for increasing the richness of the charge during full load operation. Accordingly, a maximum power enrichment device 244 is provided. This device 244 is actuated by any means responsive to the power output of the engine; for example, the position of the throttle valve 124, the intake vacuum, etc. In the present instance a diaphragm chamber 246 is connected to the intake vacuum by a full power enrichment tube 247. The diaphragm 246, in turn, is attached to the crank 248 on the end of the ratio arm shaft 194. Movement of the ratio arm shaft 194 will move the ratio arm 192 and change the mechanical advantage of the linkage 180 to thus alter the air-fuel ratio. The intake vacuum will tend to pull the crank 248 against the lean stop 250. A spring 252 biases the diaphragm 246 in the opposite direction to force the crank 248 toward the rich stop 254. The rich and lean stops 254 and 250 are set for maximum power and maximum economy respectively.

During normal operation, the intake vacuum will be fairly large and will pull the diaphragm 246 inwardly. This will, in turn, pull the crank 248 against the lean stop 250 and the ratio arm 192 will be positioned to produce a maximum economy charge. However, when the throttle valve 124 is opened for maximum power, the vacuum will be very small. Consequently, the spring 252 will move the diaphragm 246 and force the crank 248 against the rich stop 254 to produce full power operation. This, in turn, moves the ratio arm 192 and changes the mechanical advantage of the linkage 180 to produce a maximum power charge.

It has been found that in a fuel system of this nature that if the injection nozzles 170 are located adjacent the intake valves 136 and aimed at them, there will be very little wetted surface in the intake manifold 128. As a result the response is very rapid. In fact, the usual engine operates smoothly without any accelerator pump. However, under some circumstances it may be desirable to provide an accelerator pump 260 that will temporarily increase the air-fuel ratio of the charge when the throttle valve 124 is suddenly opened for accelerating the load. In the present instance this accelerator pump 260 includes a piston 262 which is disposed in a cylinder 264 in one side of the control unit housing. This piston 262 is operatively interconnected with the throttle valve 124 by means of a spring biased, lost motion linkage 266. The bottom of the cylinder 264 is connected directly with the distributing chamber 166 via a one-way check valve 268. This valve 268 has a very low "pop-off" pressure to permit the fuel to flow freely from the cylinder 264 into the chamber 166. However, the check valve 268 will prevent the escape of any fuel from the chamber 166.

When the throttle valve 124 closes the piston 262 will move upwardly in the cylinder 264 on an intake stroke and draws fuel from the spill fuel chamber. However, when the throttle valve 124 is opened the lost motion mechanism will bias the piston 262 downwardly and will normally cause the piston 262 to move downwardly. Such downward movement will force a supplemental charge of fuel through the check valve 268 and into the distributing chamber 166. It should be noted that under some operating conditions the fuel pressure in the distributing chamber 166 will be very high and, in fact, may exceed the pressure produced by the accelerator pump 260. Consequently, the accelerator pump 260 will be incapable of forcing the fuel to flow into the distributing chamber 166. Accordingly, the lost motion mechanism 266 will permit the throttle valve 124 to open even if the piston 262 does not move. If the throttle valve 124 is retained open the fuel will gradually "leak down" and allow the spring 270 to force the piston 262 to the bottom of the cylinder 264.

When the engine has been driving a load and the throttle valve 124 is closed, the momentum of the load will cause the load to overrun and drive the engine. During such circumstances the fuel consumed in the engine will perform no useful work and will be wasted. Accordingly, some economy in the fuel consumption can be accomplished by eliminating the fuel flow during these overrunning conditions. It has been found that the intake manifold vacuum will be very high during these conditions and, in fact, will exceed the normal idle vacuum. Accordingly, a fuel shut-off valve 272 may be provided to disrupt the fuel flow when the intake vacuum exceeds the normal idle condition. This shut-off valve 272 is disposed in a by-pass line 274 from the inlet 158 to the spill fuel line 152 and includes a spring biased diaphragm 276 that is connected to the valve 272. The diaphragm 276 is connected to the intake vacuum by a shut-off line 280. During normal operating conditions the spring 282 will retain the valve 272 closed and the usual fuel metering and distribution will prevail. However, whenever the intake vacuum exceeds the normal idle vacuum, the vacuum on the diaphragm 276 will compress the spring 282 and open the valve 272. This will allow fuel to flow from the fuel delivery line to the spill fuel line 152, thereby by-passing the distribution chamber 166. Since the valve 272 is upstream of the anti-percolation valve 164, the pressure at the valve 272 will be comparatively low. As a result the anti-percolation valve 164 will remain closed. This will positively eliminate any fuel flow to the distributing chamber 166 until a normal intake vacuum is again restored. At that time the valve will close and the fuel will again be distributed to the cylinders.

It is to be understood that, although the invention has been described with specific reference to particular embodiments thereof, it is not to be so limited since changes and alterations therein may be made which are within the full intended scope of this invention as defined by the appended claims.

The claims:

1. A fuel injection system for use on a multicylinder internal combustion egine comprising a distributing chamber having one end thereof interconnected with a source of fuel under pressure, a plurality of injector lines radiating from said chamber for distributing equal increments of fuel to said cylinders, a by-pass valve interconnected with said chamber for by-passing fuel from said chamber for return to said source, means responsive to the quantity of air flowing through said engine interconnected with said valve, said means being effective to actuate said valve and regulate the amount of by-passed fuel for metering the quantity of distributed fuel.

2. A fuel injection system for use on an internal combustion engine having a plurality of cylinders and an induction system for charging said cylinders, said injection system comprising a source of fuel under pressure, a distributing chamber having one end thereof interconnected with said source for receiving fuel under pressure therefrom, a plurality of injector lines radiating from said chamber for distributing equal increments of fuel to said cylinders, a by-pass valve in the opposite end of said distributing chamber for metering the quantity of said distributed fuel by by-passing the surplus fuel from said chamber for return to said source, means responsive to the air entering said engine and being effective to position said valve in response thereto for metering said fuel in proportion thereto.

3. A fuel injection system for use on an internal combustion engine having a plurality of cylinders and an induction system for charging said cylinders, said injection system comprising a source of fuel under pressure, a distributing chamber having one end thereof interconnected with said source for receiving fuel under pressure therefrom, a plurality of injector lines radiating from said chamber for distributing equal increments of fuel to said cylinders, a by-pass valve in the opposite end of said distributing chamber for metering the quantity of said distributed fuel by-passing the surplus fuel from said distributing chamber for return to said source, means in said induction system adapted to produce a signal proportional to the mass of air entering said engine, said valve being responsive to said signal so as to meter said fuel in response thereto.

4. An injection system for an internal combustion engine having a plurality of cylinders and an induction system for charging said cylinders, said injection system comprising a distributing chamber having one end thereof interconnected with a source of fuel under pressure, a plurality of substantially identical injector lines radiating from said chamber for distributing equal increments of fuel to said cylinders, said injector lines being adapted to produce a fuel pressure in said distributing chamber indicative of the quantity of fuel being distributed through said lines to said cylinders, a by-pass valve interconnected with said chamber for by-passing fuel from said chamber for return to said source, said by-pass valve being effective to meter the quantity of fuel distributed to said cylinders by regulating the amount of fuel by-passed from said chamber for return to said source, said valve being responsive to said fuel pressure in said chamber and to the mass of air flowing through said induction system to maintain said air and distributed fuel flow in some predetermined balance.

5. A fuel injection system comprising a distributing chamber, a source of fuel having an outlet connected to one end of said chamber for discharging fuel under pressure into said chamber, a plurality of injector lines radiating from said chamber for distributing equal increments of fuel to the cylinders of an internal combustion engine and producing a pressure in said distributing chamber indicative of the quantity of fuel distributed to said cylinders, a valve in said chamber effective to meter the quantity of distributed fuel and being subjected to an actuating force proportional to said pressure, and means adapted to produce a second actuating force on said valve in opposition to said first force and indicative of the mass of air passing through said engine.

6. A fuel injection system for an internal combustion engine having a plurality of cylinders and an induction system for charging said cylinders, said injection system comprising a distributing chamber having one end thereof interconnected with a source of fuel under pressure, a plurality of substantially identical injector lines radiating from said chamber for distributing equal increments of fuel to said cylinders, said injector lines being adapted to produce a fuel pressure in said distributing chamber indicative of the quantity of fuel being distributed through said lines to said cylinders, a by-pass valve disposed in said chamber for by-passing fuel from said chamber for return to said source, said valve having an area thereof exposed to said fuel pressure for producing an opening force on said valve, means adapted to produce an opposing force on said valve proportional to the mass of air flowing through said induction system, said forces being effective to position said valve for maintaining the quantities of said air and distributed fuel in some predetermined proportions.

7. An injection system for an internal combustion engine having a plurality of cylinders and an induction system for charging said cylinders, said injection system comprising a pump having an outlet for discharging fuel therefrom, a distributing chamber having one end thereof interconnected with said outlet for receiving fuel under pressure therefrom, a plurality of injector lines radiating from said chamber for distributing equal increments of fuel to said cylinders, all of said injector lines being substantially identical to each other and adapted to produce a fuel pressure in said distributing chamber indicative of the quantity of fuel distributed through said injector lines to said cylinders, a by-pass valve disposed in another end of said distributing chamber for by-passing fuel from said distributing chamber for return to said source to thereby meter the quantity of fuel distributed to said cylinders, said by-pass valve having an area thereof exposed to said fuel pressure so as to be subjected to a force effective to move said valve in a metering direction, means disposed in said induction system to be responsive to the air flowing therethrough, said means being effective to exert a force on said valve proportional to said air flow and in opposition to said first force for maintaining said distributed fuel and said air in some predetermined relation.

8. An injection system for an internal combustion engine having a plurality of cylinders and an induction system for charging said cylinders, said injection system comprising a fuel pump having an outlet for discharging fuel therefrom, a distributing chamber having one end thereof interconnected with said outlet for receiving fuel under pressure therefrom, a plurality of injector lines radiating from said chamber for distributing equal increments of fuel to said cylinders, all of said injector lines being substantially identical to each other and adapted to produce a fuel pressure in said distributing chamber indicative of the quantity of fuel being distributed through said injector lines to said cylinders, a by-pass valve disposed in another end of said distributing chamber for by-passing fuel from said distributing chamber for return to said source, said valve being effective to meter the quantity of fuel distributed to said cylinders by regulating the amount of surplus fuel by-passed from said distributing chamber, said by-pass valve having an area thereof exposed to said fuel pressure so that said valve will be subjected to an opening force thereon, means adapted to produce a signal proportional to the mass of air flowing through said induction system, said valve being responsive to said signal so as to be subjected to a second force tending to close said valve to thereby maintain said distributed fuel and said air in some predetermined relation.

9. A fuel injection system for use on a multicylinder internal combustion engine, said system comprising a distributing chamber having one end thereof interconnected with a source of fuel under pressure and being adapted to distribute equal increments of fuel to said cylinders, a piston valve interconnected with said chamber for by-passing at least a portion of the fuel in said chamber for return to said source, said piston having an area on one end thereof exposed to the pressure of the fuel in said chamber to be subjected to a force tending to open said valve, means responsive to the air entering said engine and being effective to bias said valve closed in opposition to said first force to cause said fuel to be metered in proportion to said air flow.

10. A fuel injection system for use on a multicylinder internal combustion engine having an induction system for charging said cylinders, said injection system comprising a fuel pump having an outlet for discharging fuel therefrom, a distributing chamber having one end thereof interconnected with said outlet for receiving fuel therefrom, a plurality of injector lines radiating from said chamber for distributing equal increments of fuel to said cylinders, a piston valve in the other end of said chamber for metering the quantity of distributed fuel by by-passing at least a portion of the fuel in said chamber for return to said source, said valve having an area on one end thereof exposed to the pressure of the fuel in said chamber to be subject to a force tending to open said valve and increase the amount of by-passed fuel, means in said induction system adapted to produce a closing force on said valve for decreasing said by-passed fuel, said forces being adapted to maintain said air and fuel in balance.

11. A fuel injection system for use on an internal combustion engine having a plurality of cylinders and an induction system for charging said cylinders, said injection system comprising a fuel pump having an outlet for discharging fuel therefrom, a distributing chamber having one end thereof interconnected with said outlet, a plurality of injector lines radiating from said chamber for distributing equal increments of fuel to said cylinders and producing a fuel pressure in said chamber indicative of the volume of distributed fuel, a by-pass valve in the other end of said distributing chamber adapted to meter the quantity of distributed fuel by by-passing the surplus fuel from said chamber for return to said source, said valve having an area thereof exposed to said fuel pressure for producing an opening force thereon, a venturi in the inlet to said induction system adapted to produce a pressure differential indicative of the air flow, said valve being responsive to said pressure differential to maintain said air and fuel in some predetermined proportions.

12. A fuel injection system for use on an internal combustion engine having a plurality of cylinders and an induction system for charging said cylinders, said injection system comprising a fuel pump having an outlet for discharging fuel therefrom, a distributing chamber having one end thereof interconnected with said outlet, a plurality of injector lines radiating from said chamber for distributing equal increments of fuel to said cylinders and producing a fuel pressure in said chamber indicative of the volume of distributed fuel, a valve in said distributing chamber effective to meter the quantity of distributed fuel and having an area thereof exposed to said fuel pressure for producing a metering force thereon, a venturi in the inlet to said induction system adapted to produce a pressure differential indicative of the amount of air flow through said engine, a diaphragm responsive to said pressure differential, a linkage interconnecting said valve with said diaphragm to maintain said air and fuel in some predetermined proportions.

13. A fuel injection system for use on an internal combustion engine having a plurality of cylinders and an induction system for charging said cylinders, said injection system comprising a fuel pump having an outlet for discharging fuel therefrom, a distributing chamber having one end thereof interconnected with said outlet, a plurality of injector lines radiating from said chamber for distributing equal increments of fuel to said cylinders and producing a fuel pressure in said chamber indicative of the volume of distributed fuel, a by-pass valve in the other end of said distributing chamber effective to meter the quantity of distributed fuel by by-passing the surplus fuel from said chamber for return to said source, a venturi in the inlet to said induction system adapted to produce a pressure differential indicative of the amount of air flow through said engine, a diaphragm responsive to said pressure differential, a linkage interconnecting said valve with said diaphragm to maintain said air and fuel in some predetermined proportions.

14. A fuel injection system for use in a multicylinder engine having an induction system for charging said cylinders, said injection system comprising a distributing chamber having one end thereof interconnected with a source of fuel under pressure and being effective to distribute equal increments of fuel to said cylinders, a valve interconnected with said chamber and being effective to meter the volume of said distributed fuel, the pressure of the fuel in said distributing chamber being effective to exert a force on said valve for moving it in a metering direction, means in said induction system adapted to produce another force on said valve in opposition to said first force for maintaining the proportions of air and fuel in the charge in some predetermined balance, and an enrichment device adapted to temporarily increase the effectiveness of one of said forces to temporarily change the proportions of said charge.

15. A fuel injection system for use on a multicylinder engine having an induction system for charging said cylinders, said injection system comprising a distributing chamber having one end thereof interconnected with a source of fuel under pressure, a plurality of injector lines radiating from said chamber for distributing equal increments of fuel to said cylinders, a valve interconnected with said chamber and being effective to meter the volume of said distributed fuel, said valve having an area exposed to the pressure of the fuel in said chamber for biasing said valve in a metering direction, means in said induction system adapted to produce another force on said valve for biasing said valve in an opposite metering direction, said forces opposing each other for positioning said valve to maintain the proportions of air and fuel in the charge in some predetermined balance, and an enrichment device adapted to temporarily increase the effectiveness of said second force to temporarily change the proportions of said charge.

16. A fuel injection system for an internal combustion engine comprising a distributing chamber having one end thereof interconnected with a source of fuel under pressure, a plurality of injector lines radiating from said chamber for distributing equal increments of fuel to the cylinders of an internal combustion engine, said injector lines being adapted to produce a pressure in said chamber indicative of the quantity of fuel flowing through said lines for distribution to said cylinders, a valve disposed in the other end of said chamber for metering the quantity of said distributed fuel and having an area on one end thereof exposed to said pressure to produce a force thereon tending to move said valve in a metering direction, means in said induction system for producing a force on said valve indicative of the mass of air flow and in opposition to said first force, and an enrichment device adapted to temporarily increase the strength of said second force to thereby temporarily increase the biasing force on said valve for increasing the amount of fuel distributed to said cylinders.

17. A fuel injection system for an internal combustion engine comprising a distributing chamber having one end thereof interconnected with a source of fuel under pressure, a plurality of injector lines radiating from said chamber for distributing equal increments of fuel to the cylinders of said internal combustion engine, said injector lines being adapted to produce a pressure in said chamber indicative of the quantity of fuel flowing through said lines for distribution to said cylinders, a by-pass valve disposed in the other end of said chamber for metering the quantity of said distributed fuel by by-passing the surplus portion from said chamber for return to said source, said by-pass valve having an area on one end thereof exposed to said pressure to produce a force thereon tending to open said by-pass valve, a venturi in said induction system for producing a pressure differential proportional to the mass of the air flow through said induction system, means responsive to said pressure differential for applying a force on said valve in opposition to said first force and an enrichment device adapted to temporarily increase the strength of said second force to thereby temporarily increase the second force on said valve for increasing the amount of fuel distributed to said cylinders.

18. A fuel injection system for an internal combustion engine having a plurality of cylinders and an induction system for charging said cylinders, said injection system comprising a distributor for distributing equal increments of fuel to the cylinders of said engine, means responsive to a pressure signal proportional to the quantity of air flowing into said engine, a linkage operatively interconnected with a metering mechanism in said distributor effective to meter said distributed fuel in proportion to said air flow, an enrichment device adapted to temporarily change the mechanical advantage of said linkage to thereby increase the richness of the charge.

19. A fuel injection system for an internal combustion engine having an induction system for charging the engine cylinders, said injection system comprising a distributor interconnected with a source of fuel under pressure for distributing equal increments of fuel to said cylinders, a valve in said distributor for regulating the amount of fuel distributed to said cylinders, a diaphragm responsive to a pressure signal proportional to the mass of air entering said engine, a linkage operatively interconnecting said diaphragm with said valve to actuate said valve for metering said fuel in proportion to said air flow, an enrichment device adapted to temporarily change the mechancial advantage of said linkage to thereby increase the amount of fuel distributed to the cylinders for increasing the richness of said charge.

20. A fuel injection system for an internal combustion engine comprising a distributing chamber having one end thereof interconnected with a source of fuel under pressure, a plurality of injector lines radiating from said distributor for distributing equal increments of fuel to the cylinders of said internal combustion engine, said injector lines being adapted to produce a pressure in said chamber indicative of the quantity of fuel flowing through said lines for distribution to said cylinders, a by-pass valve disposed in the other end of said chamber for metering the quantity of said distributed fuel by by-passing the surplus portion from said chamber for return to said source, said by-pass valve having an area on one end thereof exposed to said pressure to produce a force thereon tending to open said by-pass valve, a venturi in said induction system for producing a pressure differential proportioal to the mass of air flowing through said induction system, a diaphragm responsive to said pressure differential, a linkage operatively interconnecting said diaphragm with said by-pass valve for applying a force on said valve in opposition to said first force to thereby maintain said air and fuel flow in some predetermined proportions and an enrichment device adapted to temporarily change the mechanical advantage of said linkage to thereby temporarily increase the second force on said valve for increasing the amount of fuel distributed to said cylinders.

21. A fuel injection system comprising a distributing chamber having a plurality of injector lines radiating therefrom for distributing equal increments of fuel to the cylinders of an internal combustion engine, one end of said distributing chamber being interconnected with a source of fuel under pressure, a valve disposed in the other end of said distributing chamber for metering the quantity of said distributed fuel, means responsive to the air flowing through said engine connected to said valve for positioning said valve to maintain the air-fuel ratio of the charge in some predetermined proportion, an enrichment device operatively interconnected with said engine and being responsive to the operating conditions thereof, said enrichment device being coupled to said means to temporarily change the effectiveness of said means during abnormal engine operating conditions to thereby change the air-fuel ratio of the charge.

22. A fuel injection system comprising a distributing chamber, a source of fuel having an outlet connected to one end of said chamber for discharging fuel under pressure into said chamber, a plurality of injector lines radiating from said chamber for distributing equal increments of fuel to the cylinders of an internal combustion engine and producing a pressure in said distributing chamber indicative of the quantity of fuel distributed to said cylinders, a valve in said chamber effective to meter the quantity of distributed fuel and being subjected to an actuating force proportional to said pressure, means in the induction system of said engine adapted to produce a second actuating force on said valve in opposition to said first force indicative of the mass of air passing through said engine for maintaining said air and fuel in some predetermined proportion, an enrichment device operatively coupled with said engine and being responsive to the operating conditions thereof, said enrichment device being interconnected with said means to temporarily increase the effectiveness of said second actuating force to thereby temporarily change said proportions of the charge during abnormal operating conditions.

23. A fuel injection system comprising a distributing chamber having a plurality of injector lines radiating therefrom for distributing equal increments of fuel to the cylinders of an internal combustion engine, and producing a fuel pressure in said distributing chamber indicative of the amount of fuel distributed to said cylinders, a valve in said chamber effective to meter the quantity of distributed fuel and being subjected to an actuating force proportional to said pressure, means in the induction system of said engine adapted to produce a signal indicative of the mass of air entering said engine, a linkage operatively interconnecting said means with said valve for maintaining the volumes of air and fuel in some predetermined proportions, an enrichment device operatively coupled with said engine and being responsive to the operating conditions thereof, said enrichment device being interconnected with said linkage to change the mechanical advantage thereof to thereby temporarily change said proportions of the charge during abnormal operating conditions.

24. A fuel injection system for use on an internal combustion engine having a plurality of cylinders and an induction system including a plurality of induction passages for charging said cylinders, means adapted to produce a pressure indicative of the volume of said charge and a throttle valve for regulating said volume, said injection system comprising a distributor having one end thereof interconnected with a source of fuel under pressure, a plurality of substantially identical injector lines radiating from said distributor for distributing equal increments of fuel to said cylinders and producing a pressure in said distributor indicative of the volume of said distributed fuel, pressure responsive means interconnected with said first means and operatively connected to said valve for actuating said valve to maintain said pressures in some predetermined relationship, an idle enrichment device adapted to temporarily interconnect said pressure responsive means with a vent communicating with said induction system downstream of said throttle valve to thereby increase the strength of said second pressure when said throttle valve is in the idle position.

25. A fuel injection system for use on an internal combustion engine having a plurality of cylinders and an induction system including a plurality of induction passages for charging said cylinders, a venturi inlet adapted to develop a pressure differential proportional to the volume of said charge and a throttle for regulating said volume, said injection system comprising a distributor having one end thereof interconnected with a source of fuel under pressure, injector lines radiating from said distributor for distributing equal increments of fuel to the cylinders of said engine and to produce a pressure in said distributor indicative of the volume of said distributed fuel, a by-pass valve in said distributor effective to meter the volume of distributed fuel by by-passing the surplus fuel for return to said source, metering means responsive to the pressure differential developed in said venturi for positioning said valve to maintain said pressures in some predetermined proportions, and an idle enrichment device adapted to temporarily increase the strength of said second pressure by interconnecting said means with said induction system downstream of said throttle when said throttle is in the idle position.

26. A fuel injection system for use on an internal combustion engine having a plurality of cylinders and an induction system including a plurality of induction passages for charging said cylinders, a venturi inlet adapted to develop a pressure differential proportional to the volume of said charge and a throttle for regulating said volume, said injection system comprising a distributor having one end thereof interconnected with a source of fuel, a plurality of injector lines radiating from said distributor for distributing equal increments of fuel to the cylinders of said engine, metering means responsive to a pressure differential developed in said venturi and indicative of the volume of said charge, said metering means being effective to meter the quantity of said distributed fuel in proportion to said pressure differential, and an idle enrichment device including a vent in each induction system downstream of said throttle for temporarily increasing the strength of said pressure differential by interconnecting said metering means with said induction system when said throttle is in the idle position.

27. A fuel injection system for an internal combustion engine having a plurality of cylinders and an induction system with passages for charging said cylinders and a throttle for regulating the volume of said charge, said injection system comprising a distributor for distributing equal increments of fuel to said cylinders of said engine, metering means responsive to a pressure signal indicative of the air flowing through said induction system and into said engine, said metering means being effective to meter said distributed fuel in some predetermined proportion to said air flow, an idle enrichment device comprising a vent disposed in said induction system downstream of said throttle and being interconnected with said metering means for increasing the strength of said pressure signal in proportion to the induction vacuum, and a normally closed valve effective to isolate said metering means from said vent, said valve being adapted to open when said throttle is in the idle position.

28. A fuel injection system for an internal combustion engine having a plurality of cylinders and an induction system with passages for charging said cylinders and a throttle for regulating the volume of said charge, said injection system comprising a distributor for distributing equal increments of fuel to said cylinders of said engine, metering means responsive to a pressure signal indicative of the mass of air flowing through said induction system and into said engine, said metering means being effective to meter said distributed fuel in some predetermined proportion to said air flow, an idle enrichment device comprising a vent disposed in said induction system upstream of said throttle valve so as to be adjacent the edge thereof when said valve is immediately adjacent the idle position so that the induction air will flow through a restricted space between the edge of the throttle valve and said vent and means for interconnecting said vent with said metering means.

29. A fuel injection system for an internal combustion engine having a plurality of cylinders and an induction system with passages for charging said cylinders and a throttle for regulating the volume of said charge, said injection system comprising a distributor for distributing equal increments of fuel to said cylinders of said engine, metering means responsive to a pressure signal indicative of the mass of air flowing through said induction system and into said engine, said metering means being effective to meter said distributed fuel in some predetermined proportion to said air flow, an idle enrichment device comprising a pair of vents in said induction system disposed on the opposite sides of said throttle valve and immediately adjacent thereto when said throttle valve is in the idle position, and means for interconnecting said vents with said metering means.

30. A fuel injection system for an internal combustion engine having a plurality of cylinders and an induction system having means therein for creating a signal indicative of the charge for said cylinders, said injection system comprising a distributor interconnected with a source of fuel under pressure, injector lines radiating from said distributor for distributing equal increments of fuel to said cylinders and adapted to produce a fuel pressure in said distributor indicative of the amount of said distributed fuel, a by-pass valve in said distributor adapted to meter said distributed fuel by by-passing the surplus fuel for return to said source, said by-pass valve being responsive to said pressure and to said signal and effective to meter said distributed fuel to maintain said pressure and signal in some predetermined proportion, a thermostatic element responsive to the temperature of said engine effective to temporarily increase the strength of said signal whenever the temperature of said engine is below normal.

31. A fuel injection system for an internal combustion engine having a plurality of cylinders and an induction system having a venturi inlet for creating a pressure differential indicative of the volume of the charge for said cylinders, said injection system comprising a distributor interconnected with a source of fuel under pressure, a plurality of injector lines radiating from said distributor for distributing equal increments of fuel to said cylinders and maintaining a fuel pressure in said distributor indicative of the amount of fuel distributed, a by-pass valve in said distributor adapted to meter said distributed fuel by by-passing the surplus for return to said source, said valve being responsive to said pressure and said pressure differential for maintaining said air and fuel in some predetermined relation, an enrichment device comprising a thermostatic element responsive to the temperature of said engine and a valve interconnected with said thermostatic element to temporarily increase the effectiveness of said signal whenever the temperature of said engine is below normal.

32. A fuel injection system for an internal combustion engine having a plurality of cylinders and an induction system having a venturi inlet for creating a pressure differential indicative of the volume of the charge for said cylinders, said injection system comprising a distributor for distributing equal increments of fuel to said cylinders, metering means responsive to said pressure differential and being effective to meter said distributed fuel in proportion thereto, a booster venturi interconnected with the throat of said venturi inlet for multiplying the strength of said pressure differential, a thermostat responsive to the temperature of said engine for regulating the operation of said booster venturi.

33. A fuel injection system for an internal combustion engine having a plurality of cylinders and an induction system having a venturi inlet for creating a pressure differential indicative of the volume of the charge for said cylinders, said injection system comprising a distributor for distributing equal increments of fuel to said cylinders, metering means responsive to said pressure differential and being effective to meter said distributed fuel in proportion thereto, a booster venturi interconnected with the throat of said first venturi for multiplying the strength of said pressure differential, a valve interconnected with said booster venturi to control the flow therethrough and thus the amount of said multiplication, a thermostat responsive to the temperature of said engine connected to said last mentioned valve for controlling the same.

34. A fuel injection system for an internal combustion engine having a plurality of cylinders and an induction system including induction passages for charging said cylinders and a venturi for developing a pressure differential indicative of the volume of said charge, said injection system comprising a distributor interconnected with a source of fuel under pressure for distributing equal increments of fuel to said cylinders, a valve in said distributor to meter the amount of said distributed fuel, means responsive to said pressure differential operatively interconnected with said valve for metering said fuel in proportion to said air flow, a booster venturi interconnected with the throat of said venturi for multiplying the strength of said pressure differential, a thermostat responsive to the temperature of said engine for regulating the operation of said booster venturi.

35. A fuel injection system for an internal combustion engine having a plurality of cylinders and an induction system including induction passages for charging said cylinders and a venturi for developing a pressure differential indicative of the volume of said charge, said injection system comprising a distributor interconnected with a source of fuel under pressure, a plurality of injector lines radiating from said distributor for distributing equal increments of fuel to said cylinders and maintaining a fuel pressure in said distributor proportional to the amount of said distributed fuel, a by-pass valve in said distributor effective to meter the volume of said distributed fuel by by-passing the surplus fuel for return to said distributor, said valve being responsive to said fuel pressure, metering means responsive to said pressure differential operatively interconnected with said valve for maintaining said pressure and pressure differential in some predetermined proportion, a booster venturi interconnected with the throat of said venturi for multiplying the strength of said pressure differential, a thermostat responsive to the temperature of said engine and being effective to regulate said booster venturi to thereby increase the amount of said pressure differential and consequently the richness of the charge whenever the temperature of said engine is below normal.

36. A fuel injection system for an internal combustion engine having a plurality of cylinders and an induction system having a venturi inlet for creating a pressure differential indicative of the volume of the charge for said cylinders, said injection system comprising a distributor for distributing equal increments of fuel to said cylinders, metering means responsive to said pressure differential and being effective to meter said distributed fuel in proportion thereto, a booster venturi interconnected with the throat of said venturi inlet for multiplying the strength of said pressure differential to increase the ratio of distributed fuel to air, and a valve interconnected with said booster venturi to control the operation of said booster venturi.

37. A fuel injunction system for an internal combustion engine having a plurality of cylinders and an induction system having a venturi inlet adapted to produce a pressure differential indicative of the volume of the charge for said cylinders, said injection system comprising a distributor interconnected with a source of fuel under pressure, a plurality of injector lines radiating from said distributor for distributing equal increments of fuel to said cylinders and maintaining a fuel pressure in said distributor proportional to the volume of said distributed fuel, a by-pass valve in said distributor responsive to said fuel pressure and being adapted to meter the volume of fuel distributed to said cylinders by by-passing the surplus quantity for return to said source, metering means responsive to said pressure differential and being effective to actuate said valve in opposition to said fuel pressure to maintain said air and fuel in some predetermined proportion, and a starting enrichment device adapted to temporarily increase the ratio of distributed fuel to air by biasing said by-pass valve towards the closed position during the starting operation of said engine.

38. A fuel injection system for an internal combustion engine having a plurality of cylinders and an induction system for charging said cylinders, said injection system comprising a pair of fuel pumps connected in series, a distributor interconnected with the outlet of the second pump for distributing equal increments of fuel to said cylinders, metering means responsive to a signal indicative of the air entering said engine and being effective to meter said distributed fuel in proportion thereto, a starting enrichment device adapted to temporarily interconnect the outlet of the first pump with said distributor so as to by-pass said second pump for increasing the richness of the charge during the starting operation of said engine.

39. A fuel injection system for an internal combustion engine having a plurality of cylinders and an induction system for charging said cylinders, said injection system comprising a transfer pump interconnected with a source of fuel and having an outlet for discharging a high volume of fuel therefrom, an injector pump interconnected with said outlet and having an outlet for discharging fuel under high pressure therefrom, a distributor interconnected with the outlet of the injector pump for distributing equal increments of fuel to said cylinders, metering means responsive to a signal indicative of the volume of air entering said engine and being effective to meter said distributed fuel in proportion thereto, a starting enrichment device adapted to temporarily interconnect the outlet of the transfer pump with said distributor so as to by-pass said injector pump for temporarily increasing the supply of fuel to said distributor during the starting operation of said engine.

40. A fuel injection system adapted to be used on an internal combustion engine having a starter and an induction system for charging the engine cylinders, said injection system comprising a pair of pumps connected in series, a distributor interconnected with the outlet of the second of said pumps for distributing equal increments of fuel to said cylinders, metering means responsive to a signal indicative of the volume of air entering said engine and including a valve effective to meter said distributed fuel in proportion thereto, a starting enrichment device adapted to be interconnected with the engine starter for actuation with said starter, said device being adapted during actuation to simultaneously bias said valve towards the closed position and interconnect the output of said first pump directly with said distributor so as to increase the fuel distributed to said cylinders during the starting operation.

41. A fuel injection system for an internal combustion engine having a plurality of cylinders and an induction system with a venturi inlet for developing a pressure differential indicative of the volume of the charge for said cylinders, said injection system comprising a distributor having an inlet interconnected with a source of fuel under pressure for distributing equal increments of fuel to said cylinders, a metering valve in said distributor responsive to said pressure differential and being effective to meter said fuel in proportion to the amount of air flowing through said engine, a normally closed cut-out valve interconnected with the distributor inlet, said cut-out valve being responsive to the induction vacuum to open during abnormally high vacuum for by-passing fuel from said distributor for return to said source to thereby eliminate the distribution of any fuel to said cylinders during abnormally high induction vacuums.

42. A fuel injection system comprising a distributor interconnected with a source of fuel for distributing equal increments of fuel to the cylinders of an internal combustion engine, a valve in said distributor adapted to meter the quantity of said distributed fuel, means responsive to a pressure signal indicative of the quantity of air entering said engine, a linkage operatively interconnecting said means with said valve to maintain said air and fuel in some predetermined proportions, and means for changing the mechanical advantage of said linkage to thereby change the proportions of said air and fuel.

43. A fuel injection system comprising a distributor interconnected with a source of fuel for distributing equal increments of fuel to the cylinders of an internal combustion engine, a valve in said distributor adapted to meter the quantity of said distributed fuel, means responsive to a pressure signal indicative of the quantity of air entering said engine, a linkage operatively interconnecting said means with said valve for maintaining said air and fuel in some predetermined proportions, said linkage including a lever pivoting about an adjustable fulcrum and means for moving said fulcrum for changing the mechanical advantage of said linkage to thereby change the proportions of said air and fuel.

44. A fuel injection system for an internal combustion engine having a plurality of cylinders and an induction system with a venturi inlet adapted to produce a pressure differential indicative of the volume of the charge for said cylinders, said injection system comprising a distributor interconnected with a source of fuel under pressure, a plurality of injector lines radiating from said distributor for distributing equal increments of fuel to said cylinders and maintaining a fuel pressure in said distributor proportional to the volume of said distributed fuel, a valve in said distributor responsive to said fuel pressure and being adapted to meter the volume of fuel distributed to said cylinders, a diaphragm responsive to said pressure differential, a linkage operatively interconnecting said diaphragm with said valve effective to actuate said valve to maintain said air and fuel in some predetermined proportions, means for changing the mechanical advantage of said linkage to thereby change the proportions of said air and fuel.

45. A fuel injection system comprising a distributor interconnected with a source of fuel, a plurality of injector lines radiating from said distributor for distributing equal increments of fuel to the cylinders of an internal combustion engine and maintaining a fuel pressure in said distributor indicative of the volume of the distributed fuel, a valve in said distributor adapted to meter the quantity of said distributed fuel, means responsive to a signal pressure indicative of the quantity of air entering said engine, a linkage operatively interconnecting said means with said valve to maintain said pressures in some predetermined proportions, and means for changing the mechanical advantage of said linkage to thereby change the proportion of air and fuel.

46. A fuel injection system for an internal combustion engine having a plurality of cylinders and an induction system with a venturi inlet adapted to produce a pressure differential indicative of the volume of the charge for said cylinders, said injection system comprising a distributor interconnected with a source of fuel under pressure, a plurality of injector lines radiating from said distributor for distributing equal increments of fuel to said cylinders and maintaining a fuel pressure in said distributor proportional to the volume of said distributed fuel, a valve in said distributor responsive to said fuel pressure and being adapted to meter the volume of fuel distributed to said cylinders, a diaphragm responsive to said pressure differential, a linkage interconnecting said diaphragm with said valve to adjust said valve to maintain said air and fuel pressures in some predetermined proportion, means for changing the mechanical advantage of said linkage to thereby change the proportions of said air and fuel.

47. A fuel injection system for an internal combustion engine having a plurality of cylinders and an induction system with a venturi inlet adapted to produce a pressure differential indicative of the volume of the charge for said cylinders, said injection system comprising a distributor interconnected with a source of fuel under pressure, a plurality of injector lines radiating from said distributor for distributing equal increments of fuel to said cylinders and maintaining a fuel pressure in said distributor proportional to the volume of said distributed fuel, a by-pass valve in said distributor responsive to said fuel pressure and being adapted to meter the volume of fuel distributed to said cylinders by by-passing the surplus fuel from said distributor for return to said source, a diaphragm responsive to said pressure differential, a linkage interconnecting said diaphragm with said valve to adjust said valve to maintain said air and fuel pressures in some predetermined proportion, said linkage including an adjustable fulcrum, means for moving said fulcrum to change the mechanical advantage of said linkage to thereby change the proportions of said air and fuel.

48. A fuel injection system comprising a distributor interconnected with a source of fuel for distributing equal increments of fuel to the cylinders of an internal combustion engine, a valve in said distributor adapted to meter the quantity of said distributed fuel, means responsive to a pressure signal indicative of the quantity of air entering said engine, a linkage operatively interconnecting said means with said valve to maintain said air and fuel in some predetermined proportions, and means for changing the mechanical advantage of said linkage to thereby change the proportions of said air and fuel, means responsive to the induction vacuum adapted to adjust said pivot point in proportion to said vacuum.

49. A fuel injection system comprising a distributor interconnected with a source of fuel, a plurality of injector lines radiating from said distributor for distributing equal increments of fuel to the cylinders of an internal combustion engine and maintaining a fuel pressure in said distributor indicative of the volume of the distributed fuel, a valve in said distributor adapter to meter the quantity of said distributed fuel, means responsive to a signal pressure indicative of the quantity of air entering said engine, a linkage operatively interconnecting said means with said valve to maintain said pressures in some predetermined proportions, and means responsive to the vacuum in the engine induction system for adjusting the mechanical advantage of said linkage in proportion to said vacuum.

50. A fuel injection system for an internal combustion engine having a plurality of cylinders and an induction system with a venturi inlet adapted to produce a pressure differential indicative of the volume of the charge for said cylinders, said injection system comprising a distributor interconnected with a source of fuel under pressure, a plurality of injector lines radiating from said distributor for distributing equal increments of fuel to said cylinders and maintaining a fuel pressure in said distributor proportional to the volume of said distributed fuel, a by-pass valve in said distributor responsive to said fuel pressure and being adapted to meter the volume of fuel distributed to said cylinders by by-passing the surplus fuel from said distributor to said source, a diaphragm responsive to said pressure differential, a linkage interconnecting said diaphragm with said valve to adjust said valve to maintain said air and fuel pressures in some predetermined proportion, said linkage including a lever swinging about an adjustable fulcrum, means for moving said fulcrum for changing the mechanical advantage of said linkage to thereby change the proportions of said air and fuel, said means being responsive to the induction vacuum for normally retaining said fulcrum in position for a lean charge and to adjust said fulcrum for a rich charge when the induction vacuum is less than some predetermined amount.

References Cited in the file of this patent

UNITED STATES PATENTS

| | | |
|---|---|---|
| 2,136,959 | Winfield | Nov. 15, 1938 |
| 2,442,399 | Chandler | June 1, 1948 |
| 2,502,679 | Stanly | Apr. 4, 1950 |
| 2,511,213 | Leslie | June 13, 1950 |
| 2,516,147 | Robinson | July 25, 1950 |
| 2,673,556 | Reggio | Mar. 30, 1954 |
| 2,785,669 | Armstrong | Mar. 19, 1957 |